US006505643B2

(12) United States Patent
Scholten et al.

(10) Patent No.: US 6,505,643 B2
(45) Date of Patent: Jan. 14, 2003

(54) THROTTLE VALVE BODY

(75) Inventors: Lutz Scholten, Aachen (DE); Peter Welteroth, Eitorf (DE); Rolf Oppermann, Schwalbach (DE); Armin Seeger, Bad Soden (DE)

(73) Assignee: Siemens AG, Munich (DE)

( * ) Notice: Subject to any disclaimer, the term of this patent is extended or adjusted under 35 U.S.C. 154(b) by 0 days.

(21) Appl. No.: 09/948,117

(22) Filed: Sep. 6, 2001

(65) Prior Publication Data

US 2002/0056478 A1 May 16, 2002

(30) Foreign Application Priority Data

Sep. 7, 2000 (DE) ........................................ 100 44 294

(51) Int. Cl.[7] ................................................ F16K 37/00

(52) U.S. Cl. ....................... 137/554; 251/148; 251/305; 305/123; 123/337; 123/399

(58) Field of Search ..................... 137/554; 251/129.11, 251/305, 148, 152; 123/337, 399

(56) References Cited

U.S. PATENT DOCUMENTS 3,990,675 A * 11/1976 Bonafous .................... 251/148
4,392,375 A * 7/1983 Eguchi et al. ............. 73/118.1
5,374,031 A * 12/1994 Semence et al. ............ 251/305
5,609,184 A * 3/1997 Apel et al. .................. 137/554
6,283,150 B2 * 9/2001 Apel et al. .................. 137/554
6,352,241 B1 * 3/2002 Hannewald et al. ... 251/129.11

FOREIGN PATENT DOCUMENTS

| | | |
|---|---|---|
| DE | 4334180 | 4/1995 |
| DE | 19854595 | 6/2000 |

* cited by examiner

*Primary Examiner*—A. Michael Chambers
(74) *Attorney, Agent, or Firm*—Martin A. Farber

(57) ABSTRACT

A throttle valve body (10, 100), especially for an internal combustion engine of a motor vehicle, having a tubular body (16, 116), which comprises at least an outer casing (16A, 116A), an inner casing (16B, 116B), a first end face (16C, 116C) and a second end face (16D, 116D), the inner casing (16B, 116B) of the tubular body (16, 116) forming a flow duct (20, 120) through which a gaseous medium (56, 156), especially air, can flow in a main flow direction (58, 158), a throttle plate (24, 124) swivel-mounted on a throttle shaft (22, 122) being arranged in the flow duct (20, 120), is to have an especially low weight and be manufactured at least partially from standard components. For this purpose the outer casing (16A, 116A) of the tubular housing (16, 116) is at least partially enclosed by a housing (12, 112) made of plastic (14, 114), at least one actuator (30, 130) for the throttle shaft (22, 122) being arranged in the housing (12, 112) and the tubular body (16, 116) being largely composed of metal (18, 118).

18 Claims, 6 Drawing Sheets

THROTTLE VALVE BODY

FIELD AND BACKGROUND OF THE INVENTION

The invention relates to a throttle valve body, especially for an internal combustion engine of a motor vehicle, having a tubular body, which comprises at least an outer casing, an inner casing, a first end face and a second end face, the inner casing forming a flow duct through which a gaseous medium can flow in a main flow direction, a throttle plate fixed to a throttle shaft being swivel-mounted in the flow duct.

Throttle valve bodies are generally used to control the fresh charge quantity of a motor vehicle. Throttle valve bodies comprise a housing with a flow duct and a throttle member arranged in the flow duct. The throttle member assumes a certain position in the flow duct for the admission of a specific fresh charge quantity. For this purpose the throttle member may be mechanically or electronically actuated.

Housings of throttle valve bodies are usually manufactured from plastic or metal. Throttle valve body housings that are made of metal, such as aluminum, can be produced with especial accuracy and may therefore have especially fine tolerances. Fine tolerances are required for a throttle valve body in the area of the throttle plate especially where it is intended that just a very slight movement of the throttle plate should be capable of influencing the quantity of medium flowing through the flow duct of the throttle valve body. In the closing area of the throttle plate these requirements are also termed leakage air requirements.

Metal housings of throttle valve bodies have the disadvantage, however, that after manufacturing of the housing by the die-casting process, for example, expensive finishing of the housing is generally required. Finishing of aluminum housings is necessary, for example, in order to meet the proposed functional requirements in and on the housing. Functional requirements relate, in particular, to the flow duct, the accommodation for the actuator and gear mechanism center distances. Accurate machining of the bearing seats is generally also necessary, since the correct operating clearance (bearing internal clearance) is achieved only by the press fit on the needle-roller bearing.

Throttle valve body housings made of plastic have a lower weight than throttle valve body housings essentially made of metal, such as aluminum. Furthermore, as a material plastic is particularly easy to adapt to widely varying geometric configurations of the housing. In the case of plastic housings manufactured by the injection molding process, inserts such as bearings for supporting the throttle shaft can also be molded into the housing.

Throttle valve body housings made of plastic by the injection molding process have the disadvantage, however, that they shrink during and after the injection molding process. In addition, housings of this type may distort after removal from the mold, that is to say they become deformed when they are taken out of the injection mold. Nor are the dimensions of throttle valve body housings made of plastic particularly stable over an especially wide temperature range. On the one hand throttle valve body housings in a motor vehicle are exposed to outdoor temperatures as low as −40° C. On the other hand, in the operation of the throttle valve body the temperature of the throttle valve body may rise to more than 100° C. These large temperature fluctuations may lead to detrimental deformations of the plastic in the throttle plate swivel area. These deformations can in turn lead over time to a reduction of the especially high fitting accuracy of the throttle plate in the housing. In this case especially high fitting accuracy means, for example, fitting accuracies of the housing of the throttle valve body in the range from 0 to 30 $\mu$m, where the housing is subject to the ISO tolerance in respect of the dimension of the flow duct, for example. As a result of changes in the shape of the flow duct, the especially high leakage air requirements can no longer be met, particularly when the throttle is in the idle position. Associated with this are an increased fuel consumption and a reduced exhaust emission quality. Dimensional stability of the throttle valve body housing, especially the flow duct, over a number of years is therefore necessary for a constant fuel consumption and constant exhaust emission quality.

SUMMARY OF THE INVENTION

The object of the invention is therefore to specify a throttle valve body of the aforementioned type, which has an especially low weight and is especially inexpensive to manufacture and the flow duct of which has an especially high dimensional stability under especially high thermal loads. In addition the throttle valve body should be particularly easy to adapt to different installation conditions.

According to the invention this object is achieved in that the outer casing of the tubular body is at least partially enclosed by a plastic housing, at least one actuator for the throttle shaft being arranged in the housing and the tubular body being largely composed of metal.

The invention proceeds on the premise that a throttle valve body, which has an especially low weight and is especially inexpensive to manufacture, the flow duct of the throttle valve body at the same time having an especially high degree of dimensional stability, even under especially high thermal loads, should have a flow duct, which is formed, at least in the area of the throttle plate, by a metal component. This is because metal proves to be particularly dimensionally stable even under especially high thermal loads. Furthermore, metal can generally be machined with more dimensional accuracy than plastic. In addition a metal component can guarantee an especially good thermal connection to electromechanical components such as the actuator of the throttle valve body. Nevertheless, in order to ensure particular ease of manufacture of the throttle valve body, the metal enclosing the flow duct should not require the usual expensive finishing work associated with a throttle valve body housing made of metal. For this reason only the flow duct should be formed from a component made of metal. For an especially low throttle valve body manufacturing cost, the flow duct of the throttle valve body might take the form of a standard metal component. A tubular body, which is available as a standard component, is suitable for this purpose.

In order at the same time to ensure an especially low manufacturing cost for the throttle valve body together with an especially low throttle valve body weight and particular ease of adaptation to different installation conditions, the other elements of the throttle valve body and the tubular body are encapsulated in injection-molded plastic in the manner of a housing. In the process, the plastic housing at least partially encloses the tubular body. The flow duct in this case is formed by the inner casing of the tubular body and is composed of metal. However, recesses or bores may be arranged in the inner casing of the tubular body, through which measuring instruments, for example, come into contact with the flow duct. Said recesses or bores may be sealed with plastic, in order to form a smooth inner casing with the inner casing of the tubular body so as to avoid swirling in the flow duct. The flow duct is then formed not completely but almost completely of metal.

The housing to be molded on can be adapted to specific installation conditions for different throttle valve bodies. The throttle valve body is therefore formed from a uniform standard component, the tubular body, and a differing, specifically adaptable element, the housing to be molded on to the tubular body.

At least the first end face of the tubular body is advantageously enclosed by plastic. The inner casing of the tubular body is thereby protected especially reliably, at least by the first end face, against contamination, which can get into the flow duct from outside.

The outer casing of the tubular body is advantageously enclosed radially all round by the housing. This arrangement of the housing on the tubular body is particularly reliable in ensuring that the tubular body is fixed to the housing.

In addition, a position-sensing device for the throttle shaft is advantageously arranged in the housing. A position-sensing device ensures that the current position of the throttle shaft at any time can be detected and compared with a nominal position for the throttle shaft. This is particularly the case where a control unit is provided in the internal combustion engine of the motor vehicle or in the motor vehicle, to which the current position of the throttle shaft at any given time can be fed and which activates the actuator at least as a function of the nominal position of the throttle shaft, so that the difference between the actual position and the nominal position of the throttle shaft is especially low or ideally zero.

In addition, a return spring system for the throttle shaft is advantageously arranged in the housing. In the event of a failure of the actuator a return spring system causes the throttle shaft with the throttle plate arranged thereon to be brought into a position that generally corresponds to an idling position of the internal combustion engine of the motor vehicle.

The tubular body advantageously has extensions projecting radially from its outer circumferential surface. By means of these extensions the tubular body can be anchored in the plastic housing.

The projections, however, are advantageously intended to accommodate the bearings of the throttle shaft. As a result the bearings are integrated into the mechanical strength of the body. This arrangement of the bearings provides particularly stable support for the throttle shaft in the tubular body.

A metal base plate, which is at least partially enclosed by the housing and is integrally formed with the tubular body, is advantageously provided for the actuator. The actuator is thereby thermally connected to the tubular body. In operation of the throttle valve body the heat generated in the actuator can then pass by way of the connection to the tubular body in the area of the flow duct, where it is dissipated by the gaseous medium passing through the flow duct. In other words, the tubular body at least partially heated by the heat from the actuator is cooled by the medium passing through the flow duct. Moreover, the position of the actuator is predefined when fixing the actuator in the housing, thereby obviating the need for expensive adjustment operations on the actuator.

The tubular body advantageously has a first end area and a second end area, flange eyes being arranged at the first end area, which are integrally formed with the tubular body and are provided with a first connecting tube for connection of the tubular body. Flange eyes integrally formed with the tubular body provide a particularly easy means of connecting the throttle valve body to a first connecting tube, for example, allowing additional fasteners to be dispensed with.

Fasteners, which are integrally formed with the second end area and are intended for connecting the tubular body to a second connecting tube, are advantageously arranged at the second end area. These fasteners are advantageously catches, since with catches the throttle valve body only needs to be snapped into a second connecting tube, for example, and is then firmly connected to the latter.

The housing advantageously has flange eyes, which are integrally formed with the housing and in which a sleeve is advantageously arranged, for connection to the first connecting tube and/or to the second connecting tube. The sleeve may be inserted into the housing mold and then encapsulated by injection molding during manufacture of the housing. A sleeve in a plastic flange eye provides the plastic flange eye with additional stability. This ensures an especially rigid connection of the flange eye to other elements of the internal combustion engine and/or the motor vehicle arranged outside the throttle valve body.

The tubular body is advantageously made of aluminum. Aluminum is particularly easy to work with especially high accuracy.

The tubular body is advantageously formed with an approximately spherical cap shape in the throttle plate swivel area. This area of the throttle is also referred to as the idle area or low-load area. If the tubular body has a spherical cap shape at least in the area of the throttle plate, the characteristic curve of the throttle valve body can thereby be adapted to special requirements. The characteristic curve of a throttle valve body describes the interdependence between the working area or the opening angle of the throttle plate and the mass of gaseous medium that passes through the flow duct of the throttle valve body.

The housing is advantageously sealed by a housing cover, which is fixed to the housing by laser welding. This especially durable connection of the housing to the housing cover is particularly reliable in ensuring that the housing is reliably sealed against external dirt penetration even over an especially long operating period of the throttle valve body. Alternatively, however, the housing cover can also be bonded on to the housing.

The advantages obtained with the invention reside, in particular, in the fact that a standard component such as a tubular body is used in order to take account of widely varying requirements for the so-called "body" interface, since plastic has hitherto not been suitable for manufacturing all the known interfaces used. Moreover, with a tubular metal body, especially one of aluminum, it is particularly easy to impress widely differing internal contours according to requirements. At the same time metal has an especially high dimensional stability even under extreme thermal loads. At the same time account can be taken of specific throttle valve body requirements with regard to the prevailing installation conditions by varying the plastic shape for the housing. As a result such a throttle valve body is significantly lighter than a conventional throttle valve body made of metal.

The tubular body is therefore a standard component, which is encapsulated by injection molding in a suitable housing for adaptation to different types of motor vehicle. The manufacturing cost of a throttle valve body for a multiplicity of motor vehicles and/or internal combustion engines thereby proves to be particularly low. In this the especially high torsional rigidity of the tubular body made of metal in conjunction with the especially low torsional rigidity of the plastic ensures an especially high degree of dimensional stability for the respective throttle valve body. In particular, any bending of the dimensionally critical body area when fitted on so-called uneven intake manifolds is virtually excluded. At the same time, by virtue of its particularly smooth internal contour, the metal tubular body is particularly reliable in avoiding swirling of the medium flowing in the flow duct.

BRIEF DESCRIPTION OF THE DRAWINGS

An exemplary embodiment of the invention will be explained in more detail with reference to a drawing, in which.

DETAILED DESCRIPTION OF THE PREFERRED EMBODIMENT

Corresponding parts are denoted by the same reference numbers in all figures.

Figure 1:
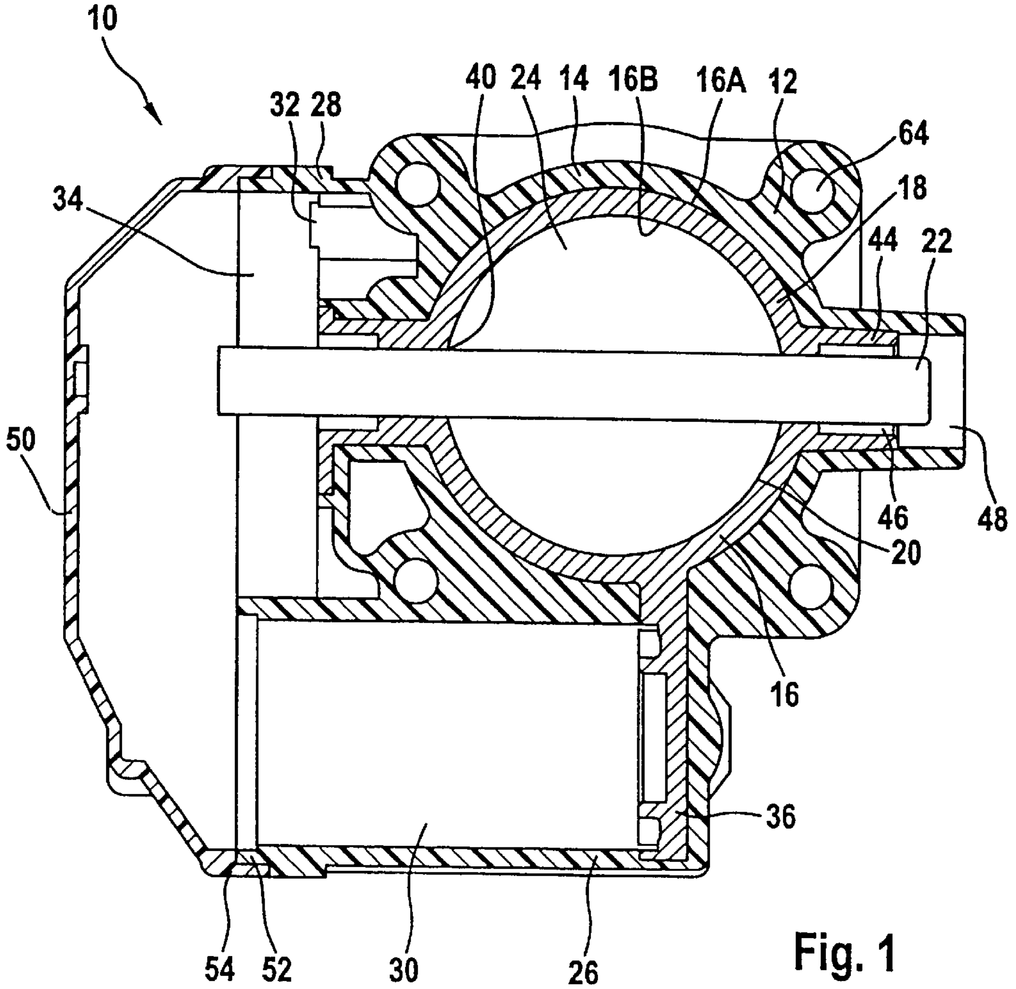
FIG. 1 shows a schematic cross section through a throttle valve body in a first embodiment.

The throttle valve body 10 according to FIG. 1 serves to deliver an air or fuel-air mixture to a consumer (not shown), for example an injection device of a motor vehicle (likewise not shown), it being possible by means of the throttle valve body 10 to control the quantity of fresh charge to be fed to the consumer. For this purpose the throttle valve body 10 has a housing 12, which is largely made of plastic 14 and has been manufactured by the injection molding process. The housing 12 encloses a tubular body 16 radially all round, the body being a standard component made of metal 18. The tubular body comprises an outer casing 16A and an inner casing 16B. In this exemplary embodiment the metal 18 takes the form of aluminum. In the manufacture of the housing 12 by the injection molding process, the tubular body 16 is inserted into the mold for the housing 12 and the outer casing 16A of the tubular body 16 is then encapsulated in plastic by injection molding.

The tubular body 16 forms the peripheral wall for the flow duct 20, via which air or an fuel-air mixture can be delivered to the consumer (not shown). A throttle plate 24 is arranged on a throttle shaft 22 for adjusting the volume of fresh charge to be delivered to the consumer. A rotation of the throttle shaft 22 at the same time causes a swivelling of the throttle plate 24 arranged on the throttle shaft 22, thereby enlarging or reducing the cross section of the flow duct 20. Enlarging or reducing the cross section of the flow duct 20 through the throttle plate 24 adjusts the rate of flow of the air or fuel-air mixture through the flow duct 20 of the throttle valve body 10.

The throttle shaft 22 can be connected to a cable sheave, not represented further, which is in turn connected by way of a Bowden cable to an output requirement adjusting device. The adjusting device may here take the form of an accelerator pedal of a motor vehicle, so that an actuation of this adjusting device by the driver of the motor vehicle can bring the throttle plate 24 from a minimum opening position, especially a closed position, into a maximum opening position, especially an open position, in order thereby to control the power output of the motor vehicle.

By contrast, the throttle shaft 22 of the throttle valve body 10 shown in FIG. 1 is either adjustable in a partial range by an actuator and otherwise by way of the accelerator pedal, or the throttle plate 24 can be adjusted over the entire adjustment range by an actuator. In these so-called electronic throttle control or drive-by-wire systems the mechanical power control, such as the depression of an accelerator pedal, for example, is converted into an electrical signal. This signal is in turn fed to a control unit, which generates an activating signal for the actuator. In these systems there is in normal operation no mechanical linkage between the accelerator pedal and the throttle plate 24.

For adjusting the throttle shaft 22 and hence the throttle plate 24 the throttle valve body 10 therefore has a drive housing 26 and a gear housing 28. The drive housing 26 and the gear housing 28 are integrally formed with the housing 12 of the throttle valve body 10, but may also together form a separate, integral unit, or they may each be designed separately. An actuator 30 in the form of an electric motor is arranged in the drive housing 26. A position-sensing device 32 on the one hand and a gear mechanism 34 on the other are arranged in the gear housing 28. The position-sensing device 32 and the gear mechanism 34 are not shown in more detail in the drawing. A rotary motion of the actuator 20 in the form of an electric motor can be transmitted to the throttle shaft 22 by way of the gear mechanism 34.

The actuator 30 in the form of an electric motor is activated by way of a control unit, which is likewise not represented in the drawing. The control unit transmits a signal to the actuator 30 in the form of an electric motor, by means of which signal the actuator 30 in the form of an electric motor adjusts the throttle shaft 22 by way of the reduction gear. The actual position of the throttle shaft 22 is detected by the position-sensing device 32. For this purpose the position-sensing device 32 is designed as a potentiometer, in which the slider of the potentiometer is connected to the throttle shaft 22.

The tubular body 16 partially enclosed by the housing 12 in FIG. 1 is made of metal 18, in the form of aluminum. The tubular body 16 has been inserted into the mold for the housing 12 during manufacture of the housing 12 by the injection molding process. The outer casing 16A of the tubular body 16 has then been encapsulated in plastic by injection molding. In its simplest form the tubular body 16 is a piece of tube. The tubular body 16 is integrally formed with a base plate 36, on which the actuator 30 in the form of an electric motor is arranged. The heat from the actuator 30 in the form of an electric motor can thereby be at least partially transmitted to the flow duct 20. Furthermore, the tubular body has lead-through bushings 40 for the throttle shaft 22. The inner casing 16B of the tubular body 16 is of even design. The inner casing 16B of the tubular body 16 may also be contoured, however, so as to guarantee predefined characteristic curves for the volumetric rate of flow through the flow duct 20 as a function of the position of the throttle shaft 22 and the throttle plate 24 fixed thereto. In particular the inner casing 16B of the tubular body 16 may be designed with a spherical cap shape at least in the positioning area of the throttle plate 24, usually a few angular degrees removed from the closed position of the throttle plate 24.

According to FIG. 1 the tubular body 16 has an extension 44 in the area of each of the two lead-though bushings 40. The two extensions 44 are intended to accommodate bearings 46 for the throttle shaft 22. As a result the housing 12 of the throttle valve body 10 proves particularly easy to assemble, since after producing the housing 12 the bearings 46 only have to be inserted into the extensions 44 of the tubular body 16 intended for this purpose. Furthermore the metal extensions 44 of the tubular body 16 ensure an especially high torsional rigidity of the surroundings in which the bearings 46 of the throttle shaft 22 are arranged.

The throttle shaft 22 ends on one side—according to FIG. 1 on the right-hand side—in a space 48, in which, for example, a spring system with so-called return springs and/or emergency running springs can be accommodated. Alternatively, however, the return springs and/or emergency running springs may also be accommodated on the left-hand side. The return springs and/or emergency running springs of the spring system 49 bias the throttle shaft 22 in the closing direction, so that the actuator 30 in the form of an electric motor functions against the force of the return springs and/or emergency running springs. A so-called return spring and/or emergency running spring of the spring system ensures that in the event of a failure of the actuator 30 in the form of an electric motor the throttle plate 24 is brought into a defined position, generally in excess of the idling speed. Alternatively or in addition, the throttle shaft 22 may also protrude beyond the space 48 out of the housing 12 of the throttle valve body 10. It is then possible, for example, to fit a cable sheave, not represented in the drawing, to the end of the throttle shaft 22, which is connected by way of a Bowden cable to an accelerator pedal, thereby providing a mechanical set-point adjustment. Said mechanical linkage of the throttle shaft 22 to the accelerator pedal, not represented in more detail in the drawing, is capable of ensuring operation of the throttle valve body 10 in emergency situations, for example in the event of a failure of the actuator. In addition, further projections may be arranged on the end face of the extensions 44, the projections being intended to accommodate additional elements, such as stub shafts for gears or toothed segments of the gear mechanism (not shown), which is designed as reduction gearing. Further elements of the throttle valve body 10 may also be arranged in the space 48.

The housing 12 of the throttle valve body 10 can be closed by means of a housing cover 50. For this purpose the housing 12 of the throttle valve body 10 has a circumferential flattening 52 facing the housing cover 50, the flattening corresponding to a circumferential ridge 54 of the housing cover 50. The flattening 52 and the ridge 54 ensure a well-defined position of the housing cover 50 on the housing 12. After fitting the housing cover 50 onto the housing 12, the two opposing faces of the flattening 52 and the ridge 54 are fused together by means of a laser beam, producing a virtually permanent connection. Alternatively, however, the housing cover 50 may also be bonded onto the housing 12. In addition the housing 12 has flange eyes 64 for the connection of elements, which are arranged outside the throttle valve body 10 and are integrally formed with the housing 12.

Figure 2:
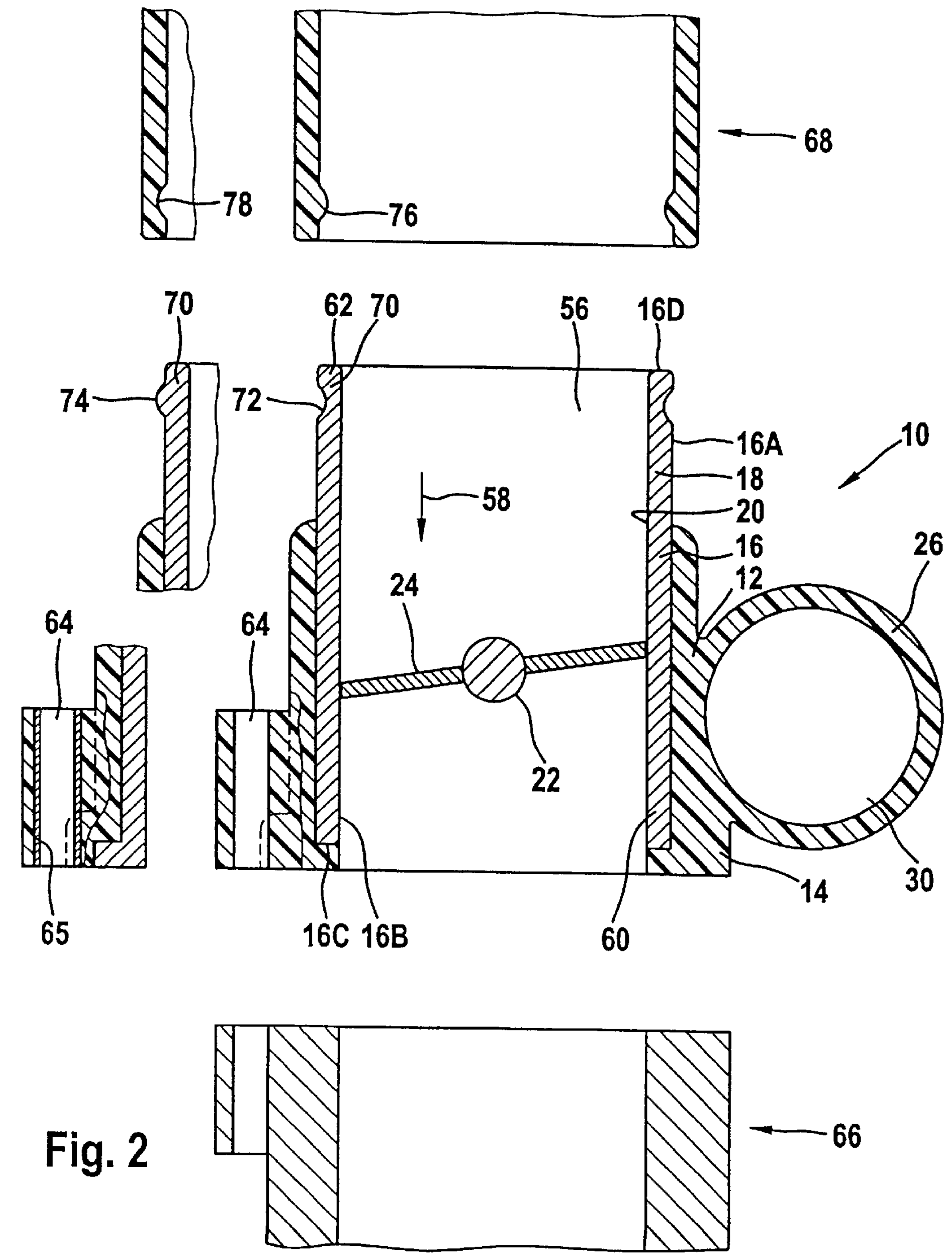
FIG. 2 shows a schematic longitudinal section through a throttle valve body in the first embodiment according to FIG. 1.

FIG. 2 shows a schematic longitudinal section through the first embodiment of the throttle valve body 10 according to FIG. 1. According to FIG. 2 the tubular body 16 is designed as simple hollow cylinder and is made of metal 18 in the form of aluminum. The outer casing 16A of the tubular body 16 is enclosed by the plastic 14 of the housing 12. The inward-facing inner casing 16B of the tubular body 16 is designed as an even surface and is in no way covered by the plastic 14 of the housing 12. Clearly discernible are the first end face 16C and the second end face 16D of the tubular body 16. In this exemplary embodiment the first end face 16C is enclosed by the plastic 14 of the housing 12. This is particularly reliable in protecting the inner casing 16B of the tubular body 16 against the penetration of contamination from outside.

The throttle plate 24 is supported in the area of the tubular body 16 by means of the throttle shaft 22 so that it is capable of swivelling in the extensions 44 of the tubular body 16, which in FIG. 2 cannot be seen owing to the nature of the section. The drive housing 26 is integrally formed with the housing 12 of the throttle valve body 10.

In the operation of the throttle valve body gaseous medium 56 passes through the flow duct 20 of the throttle valve body 10 formed by the tubular body 16. In passing through the flow duct 20, the gaseous medium 56 flows in a main direction of flow 58, identified by an arrow. The gaseous medium 56 in this exemplary embodiment takes the form of air, but alternatively may also be a fuel-air mixture.

It can be clearly seen from FIG. 2 that the tubular body 16 has a first end area 60 and a second end area 62. Flange eyes 64, which are integrally formed with the housing 12 and are intended for connecting the tubular body 16 to a first connecting tube 66, are arranged at the first end area 60 of the tubular body 16. The first connecting tube 66 is made of metal 18, but alternatively may also be made of plastic 14. A sleeve 65, which stabilizes the respective flange eye 64, may be arranged in each of the flange eyes 64. A sleeve 65 in the flange eye 64 ensures an especially rigid connection of the flange eye 64 to the first connecting tube 66. At the second end area 62 the tubular body 16 has fasteners 68, which are integrally formed with the second end area 62 and are intended for connecting the tubular body 16 to a second connecting tube 68. The second connecting tube is made of plastic 14 but alternatively may also be made of metal 18. The fasteners 70 are designed as catches. At the same time the fasteners 70 may be designed as a groove 72 or as a ring 74 projecting from the inner casing 16B of the tubular body 16. The tubular body 16 can be snapped into the second connecting tube 68 by means of the fasteners 70 designed as catches. If the fasteners 70 are designed as a groove, the second connecting tube 68 has a ring 76, into which the groove 72 of the tubular body 16 can be snapped. Should the fasteners 70 be designed as a raised ring 74, however, the second connecting tube 68 has a groove 78, into which the raised ring 74 of the tubular body 16 can be snapped.

Figure 3:
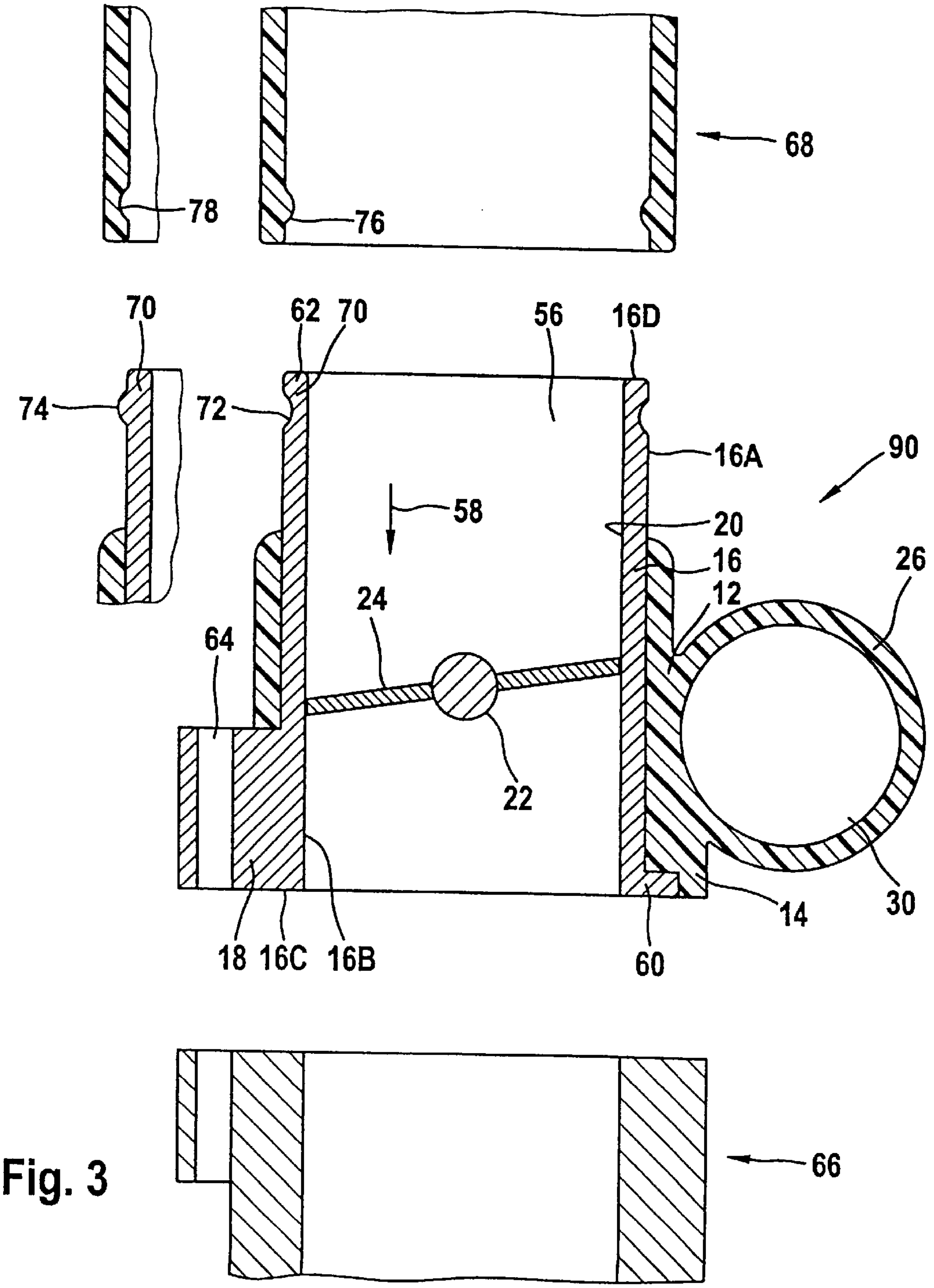
FIG. 3 shows a schematic longitudinal section through a throttle valve body in a second embodiment.

FIG. 3 shows a second embodiment of the throttle valve body 90 in cross section. The elements in the throttle valve body 90 that correspond to those of the throttle valve body in FIGS. 1 and 2 are not further described here. The reference numbers from FIGS. 1 and 2 are used for elements corresponding to those in FIGS. 1 and 2. In contrast to the throttle valve body 10 according to FIGS. 1 and 2, the throttle valve body 90 according to FIG. 3 has flange eyes 64, which are not made of the plastic 14 of the housing 12, but are integrally formed with the tubular body 16. This embodiment ensures an especially rigid connection between the tubular body and a second connecting tube 68.

Figure 4:
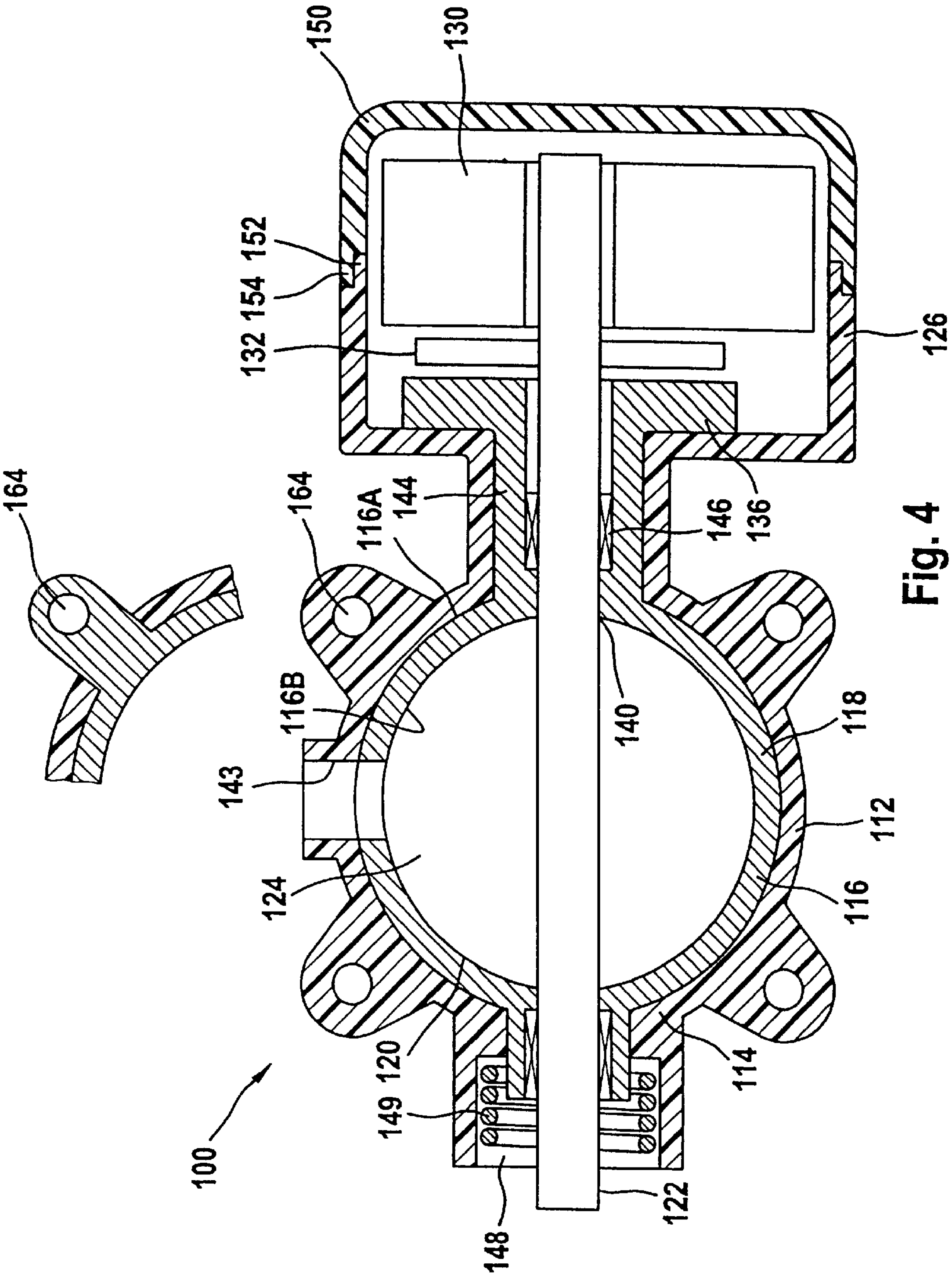
FIG. 4 shows a schematic cross section through a throttle valve body in a third embodiment.

FIG. 4 shows a cross section through a throttle valve body 100 in a third embodiment. The general functional aspects described for the throttle valve body 10 according to FIGS. 1, 2 and 3 also apply to the throttle valve body 100. The throttle valve body 100 comprises a housing 112 made of plastic 114 and a tubular body 116 made of metal 118, which in this embodiment, too, is made of aluminum. The tubular body has an outer casing 116A and an inner casing 116B. The inner casing 116B of the tubular body 116 forms the boundary of the flow duct 120. The throttle shaft 122, on which a throttle plate 124 is rigidly fixed, is arranged in the flow duct 120. The outer casing 116A of the tubular body 116 is encapsulated by plastic when manufacturing the housing 112 by the injection molding process.

The throttle valve body 100 comprises a drive housing 126, which in this exemplary embodiment is integrally formed with the housing 112. An actuator 130, which according to FIG. 4 takes the form of a so-called torquer, is arranged in the drive housing 126. A torquer is an actuator of especially simple design. In a so-called torquer, a permanent magnet, preferably with only one north pole and one south pole, is firmly seated on the throttle shaft 122. A coil is arranged on a yoke almost completely surrounding the permanent magnet. When a current is passed through the coil a magnetic field is produced, which causes a rotational movement of the magnet rigidly connected to the throttle shaft. This causes a rotation of the throttle shaft 122. The individual components of the torquer are not represented in more detail in FIG. 3. A position-sensing device 132 is arranged along the throttle shaft 122 between the actuator 130, designed as torquer, and the flow duct 120. Since the actuator 130 designed as torquer acts directly on the throttle shaft 122, a gear mechanism, in particular a reduction gearing, can be dispensed with.

The end of th e throttle shaft 122 remote from the actuator 130 designed as torquer opens into a space 148, in which further elements of the throttle valve body can be arranged. In emergencies, the throttle shaft 122 of the throttle valve body 100 can also be connected to this end by means of a Bowden cable, not further represented in the drawing, the function of which is described in the description of FIG. 1.

A spring system 149 is arranged on the end of the throttle shaft 122 remote from the actuator 130 designed as torquer. The spring system 149 has a return spring and, in exactly the same way as the spring system 49 described for the throttle valve body 10 in the first embodiment, in the event of a failure of the actuator 130 designed as torquer brings about an adjustment of the throttle shaft 122 into a position which is prefixed and corresponds to a so-called idle position.

In this exemplary embodiment also, the tubular body 116 is a standard component and in its simplest form is a piece of tube. The tubular body 116 is integrally formed with a base plate 136, on which the actuator 130 designed as torquer is arranged together with the position sensing device 132. The tubular body 116 has lead-through bushings 140. The inner casing 116B of the flow duct 120 is breached by a bore 143 at a further point. Further sensors such as pressure and temperature sensors can be arranged in the bore 143. Outwardly directed extensions 144, in which bearings 146 of the throttle shaft 122 are arranged, adjoin the lead-though bushings 140.

The housing 112 of the throttle valve body 100 can also be closed by a housing cover 150. For this purpose the housing 112 again has a circumferential flattening 152 and the housing cover 150 a circumferential ridge 154. For an especial tightness of the housing 112 of the throttle valve body 100, the flattening 152 and the ridge 154 are welded together by means of a laser beam. Alternatively, however, the housing 112 and the housing cover 150 may also be bonded together.

The tubular body 116 furthermore has flange eyes 164, by way of which the tubular body 116 can be connected to a first connecting tube, which is not further represented in FIG. 4. The flange eyes 164 may either be made from the plastic 114 of the housing 112 or may be integrally formed with the tubular body 116. In the case of flange eyes 164 made of plastic 114 a sleeve 165 is usually arranged in the flange eyes 164.

Figure 5:
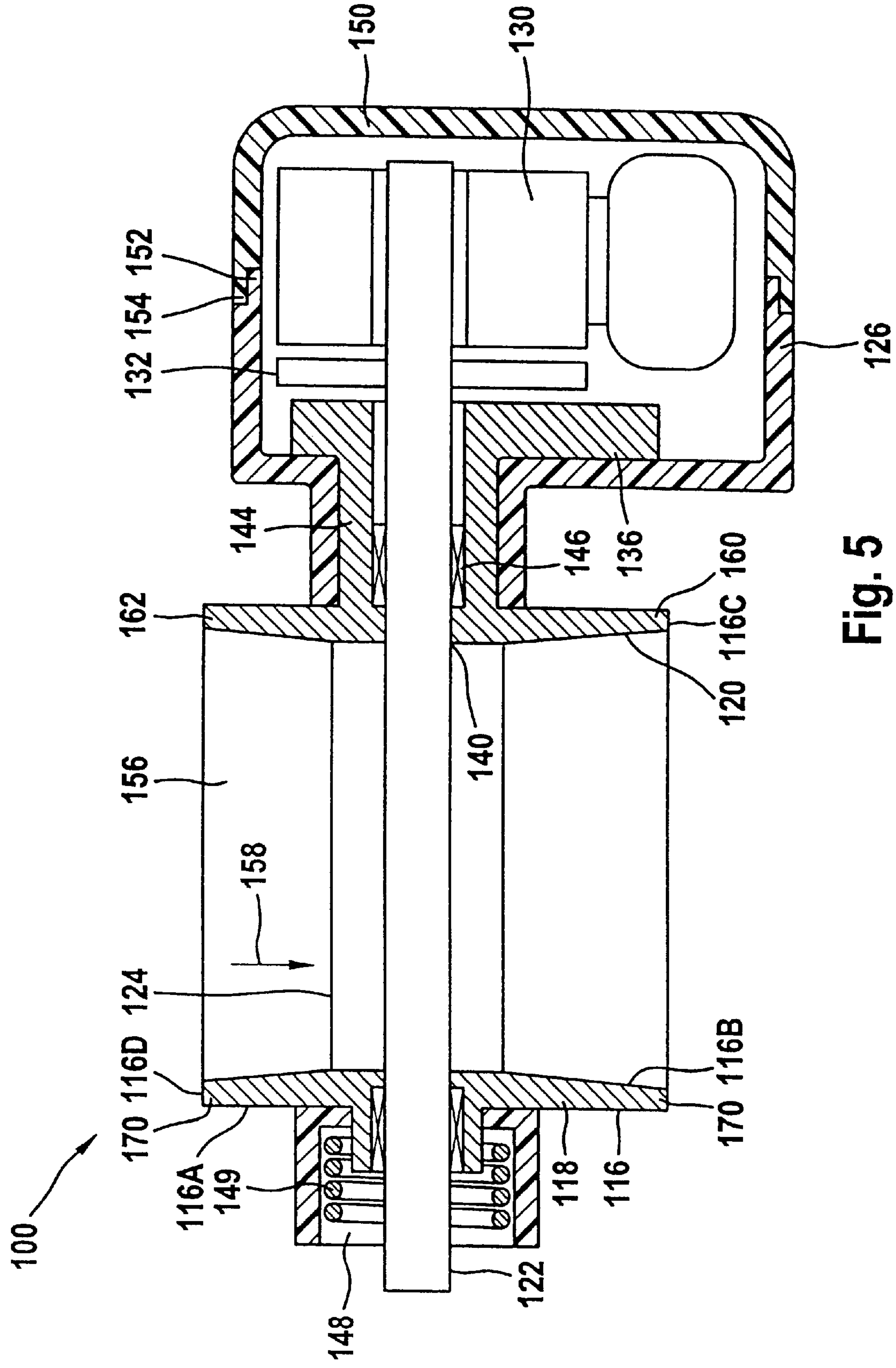
FIG. 5 shows a schematic longitudinal section through a throttle valve body in the third embodiment according to FIG. 4.

FIG. 5 shows a schematic longitudinal section through a throttle valve body 100 in the third embodiment according to FIG. 4. Clearly discernible is the tubular body 116, which with an extension 144 and the base plate 136 protrudes into the drive housing 126. In this representation of the tubular body 16 the first end face 16A and the second end face 16B can also be clearly seen. The tubular body 116 has a first end area 160 and a second end area 162. In this embodiment no flange eye 164 is arranged at the first end area 160. However, the second end area 162 does not have any fasteners 170 designed as catches as in the throttle valve body 10 described in FIGS. 1, 2 and 3. Alternatively, however, the tubular body 116 of the throttle valve body 100 may have both flange eyes 164 and fasteners 170 designed as catches as in the throttle valve body 10 described in FIGS. 1, 2 and 3. The fasteners 170 of the throttle valve body 100 are formed by the simple cylindrical shape of the tubular body 116, to which elements arranged outside the throttle valve body 100 can be connected. For example, a connecting tube can be firmly flange-mounted on the tubular body by means of a clamp.

The flow duct 120 of the throttle valve body 100 is also capable of admitting the passage of a gaseous medium 156, which in this embodiment takes the form of a fuel-air mixture. In the operation of the throttle valve body 100 the gaseous medium 156 in the form of a fuel-air mixture flows in a main direction of flow 158 through the flow duct 120, which is identified by an arrow.

Figure 6:
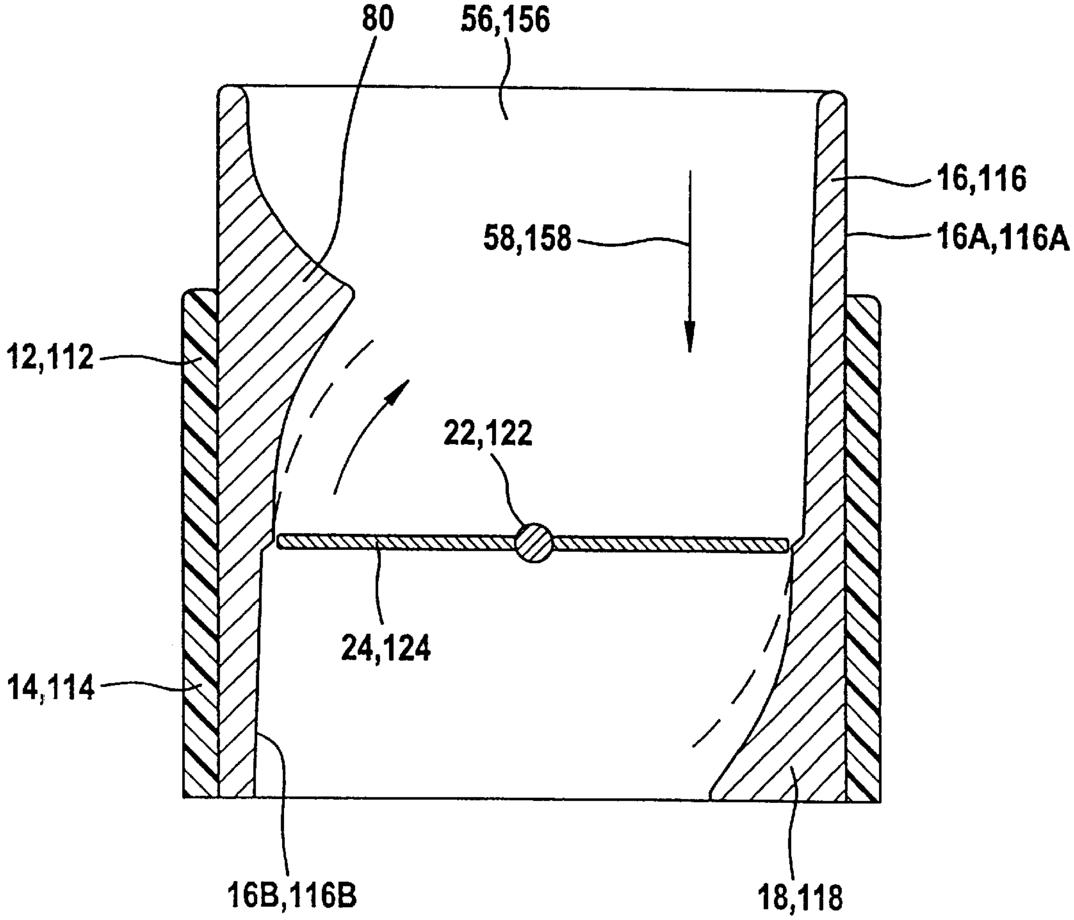
FIG. 6 shows a schematic section of the flow duct according to the throttle valve bodies in FIGS. 1 to 2, 3 and 4 to 5.

FIG. 6 shows a spherical cap-shaped design of the flow ducts 20 and 120 of the throttle valve body 10 and 100 respectively. In other words, both the tubular body 16 and the tubular body 116 of the throttle valve body 10 and 100 respectively may be of spherical cap-shaped design in the area of the throttle plate 24 and 124. For this purpose the tubular body 16 and 116 has a spherical cap shape 80 in the positioning area of the throttle plate 24 and 124, usually a few angular degrees distant from the closed position of the throttle plate 24 and 124. In this way it is possible to influence the characteristic curve of the throttle valve body 10 and 100.

Both the throttle valve body 10 and the throttle valve body 100 have a tubular body 16 and 116 respectively, which constitutes a standard component of particular dimensional stability. Moreover, by means of minor modifications the tubular part 16 and 116 is particularly easy to adapt to widely varying requirements. On the one hand the tubular part 16 and 116 may have flange eyes 64 and 164, respectively, and/or fasteners 70, in order to connect the throttle valve body 10 and 100 to a first connecting tube 66 or a second connecting tube 68. On the other hand a base plate 36 and 136 provided for the actuator 30 and 130 may also be integrally formed with the tubular body 16 and 116. The use of a standard component, namely the tubular body 16 and 116, is linked with a plastic form of the housing 12 and 112, which is particularly easy to adapt to widely varying installation requirements. Connecting the plastic housing 12 and

112 to a tubular body 16 and 116 made from metal is particularly reliable in ensuring the connection of a housing 12 and 112, adaptable to specific requirements, to a standard component, the tubular body 16 and 116. By varying the shape of the housing 12 and 112, widely differing throttle valve bodies 10 and 100 can be manufactured without having to modify the shape of the tubular body 16 and 116 to meet special requirements. As a result the manufacturing cost for a multiplicity of throttle valve bodies 10 and 100 is particularly low.

Because it is made of metal, the tubular body 16 and 116 ensures that the flow duct 20 and 120 affords a particularly high dimensional stability, especially under particularly high thermal loads. At the same time the support for the bearings 46 and 146 is designed for particularly high loads, owing to the mechanical strength of the tubular body 16 and 116. Overall, the connection of a particularly dimensionally stable tubular body 16 and 116 to a plastic with a susceptibility to particularly low torsional rigidity ensures a particular dimensional stability of the throttle valve body 10 and 100 with regard to bending of the dimensionally critical body, together with an especially low weight of the throttle valve body 10 and 100. Moreover, the simple and easily handled fixing of the housing cover 50 and 150 on the housing by means of laser welding ensures a particularly tight sealing of the housing 12 and 112 against external influences.

What is claimed is:

1. A throttle valve body (10, 100), especially for an internal combustion engine of a motor vehicle, having a tubular body (16, 116), which comprises at least an outer casing (16A, 116A), an inner casing (16B, 116B), a first end face (16C, 116C) and a second end face (16D, 116D), the inner casing (16B, 116B) forming a flow duct (20, 120) through which a gaseous medium (56, 156) can flow, a throttle plate (24, 124) fixed to a throttle shaft (22, 122) being swivel-mounted in the inner casing (16B, 116B), wherein the outer casing (16A, 116A) of the tubular housing (16, 116) is at least partially enclosed by a housing (12, 112) made of plastic (14, 114), at least one actuator (30, 130) for said throttle shaft (22, 122) being arranged in the housing (12, 112) and the tubular body (16, 116) being largely composed of metal (18, 118), the tubular housing (16, 116) having at least one end extending from the plastic (14, 114) and fastening means (70) or flange eyes (64) disposed on said at least one end.

2. The throttle valve body (10, 100) as claimed in claim 1, wherein at least said first end face (16C, 116C) of the tubular body (16, 116) is enclosed by plastic (14, 114).

3. The throttle valve body (10, 100) as claimed in claim 1, wherein the outer casing (16A, 116A) of the tubular body (16, 116) is enclosed radially all round by the housing (12, 112).

4. The throttle valve body (10, 100) as claimed in claim 1, wherein in addition a position-sensing device (32, 132) for the throttle shaft (22, 122) is arranged in the housing (12, 112).

5. The throttle valve body (10, 100) as claimed in claim 1, wherein in addition a spring system (49, 149) for the throttle shaft (22, 122) is arranged in the housing (12, 112).

6. The throttle valve body (10, 100) as claimed in claim 1, wherein the tubular body (16, 116) has extensions (44, 144) projecting radially from its outer circumferential surface.

7. The throttle valve body (10, 100) as claimed in claim 6, wherein the extensions (44, 144) are to accommodate bearings (46, 146) of the throttle shaft (22, 122).

8. The throttle valve body (10, 100) as claimed in claim 1, wherein a base plate (36, 136) made of metal (18, 118) is provided for the actuator (30, 130), the plate being at least partially enclosed by the housing (12, 112) and integrally formed with the tubular body (16, 116).

9. The throttle valve body (10, 100) as claimed in claim 1, wherein the tubular body (16, 116) has a first end area (60, 160) and a second end area (62, 162), flange eyes (64, 164), which are integrally formed with the tubular body (16, 116) and are provided with a first connecting tube (66) for connection of the tubular body (16, 116), being arranged at the first end area (60).

10. The throttle valve body (10, 100) as claimed in claim 9, wherein fasteners (70), which are integrally formed with the second end area (62, 162) and are for connecting the tubular body (16, 116) to a second connecting tube (68), are arranged at the second end area (62, 162).

11. The throttle valve body (10, 100) as claimed in claim 10, wherein said fasteners (70) are catches.

12. The throttle valve body (10, 100) as claimed in claim 1, wherein the housing (11, 112) has flange eyes (64, 164), which are integrally formed with the housing (12, 112), for connection to a first connecting tube (66) and/or to a second connecting tube (68).

13. The throttle valve body (10, 100) as claimed in claim 12, wherein a sleeve (65, 165) is arranged in at least one of said flange eyes (64, 164).

14. The throttle valve body (10, 100) as claimed in claim 1, wherein the tubular body (16, 116) is made from aluminum.

15. The throttle valve body (10, 100) as claimed in claim 1, wherein the tubular body (16, 116) has an approximately spherical cap shape in swivel area of the throttle plate (24, 124).

16. The throttle valve body (10, 100) as claimed in claim 1, wherein the housing (12, 112) is closed by a housing cover (50, 150), which is fixed to the housing (12, 112) by laser welding.

17. The throttle valve body (10, 100) as claimed in claim 1, wherein the tubular body has an end area (62, 162), fasteners (70), which are integrally formed with the end area- (62, 162) and are for connecting the tubular body (16, 116) to a connecting tube (68), are arranged at the end area (62, 162).

18. The throttle valve body (10, 100) as claimed in claim 1, wherein said fasteners (70) are catches.

* * * * *